(No Model.)
F. SCHREIDT.
ART OF MANUFACTURING CARRIAGE TOP IRONS.
No. 386,851. Patented July 31, 1888.
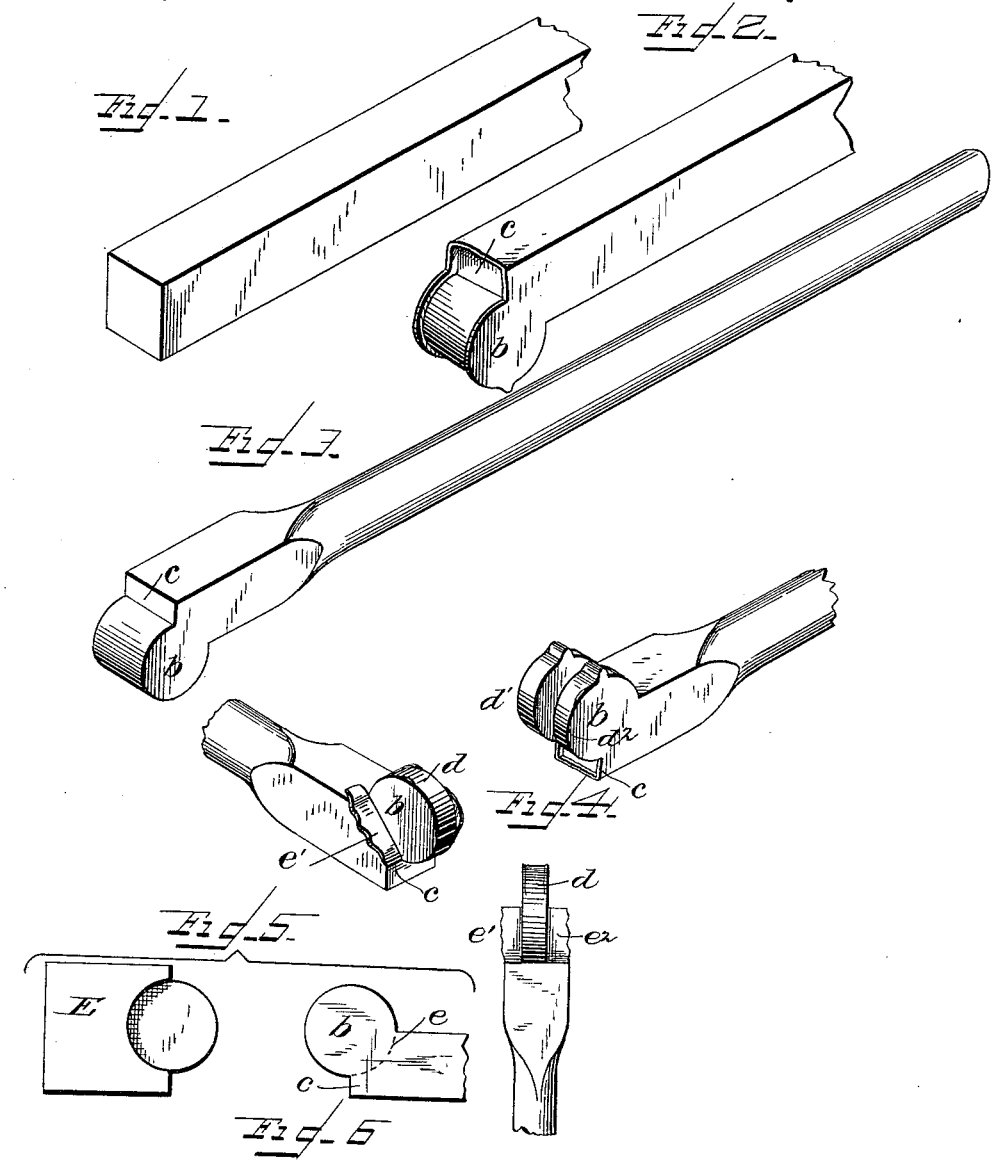
WITNESSES
INVENTOR
Frank Schreidt,
by A. M. Smith,
Attorney.
N. PETERS, Photo-Lithographer, Washington, D. C.

UNITED STATES PATENT OFFICE.

FRANK SCHREIDT, OF MANSFIELD, OHIO, ASSIGNOR TO THE SCHREIDT & MILLER COMPANY, OF SAME PLACE.

ART OF MANUFACTURING CARRIAGE-TOP IRONS.

SPECIFICATION forming part of Letters Patent No. 386,851, dated July 31, 1888.

Application filed November 14, 1887. Serial No. 255,095. (No model.)

*To all whom it may concern:*

Be it known that I, FRANK SCHREIDT, of Mansfield, county of Richland, and State of Ohio, have invented a new and useful Improvement in the Art or Method of Manufacturing Carriage-Top Irons, of which the following is a full, clear, and exact description, reference being had to the accompanying drawings, making part of this specification.

My invention relates to an improvement in the art or method of forming the knuckle-joints for carriage-top and other irons of similar character or formation, having interlapping ears, through which the parts of the joint are united. In the ordinary method of making these irons, in the formation of each bar or portion of the joint, it is usual to form the joint in a short blank of rectangular iron, to which a bar of elliptical or other desired form constituting the body of the bar or iron is welded, and as there are ordinarily two such joints on each side of the carriage-top, one in each horizontal and one in each upright portion thereof, it follows that to form the four joints, each composed of two parts, it has heretofore been necessary to form eight welds in uniting the parts to form one set of joints for a carriage or buggy top. This has made the process of forming a set of joints both tedious and expensive, the more so because the main portion or body of the iron had to be made of iron previously rolled into oval or other desired form, and iron bars in this form are more expensive than iron bars in square or rectangular form of the required dimensions for the purpose.

By my improved method, hereinafter described, I am enabled to form the parts of the irons directly from iron in rectangular bars of the required dimensions, and to dispense with all welding, making each bar of iron from a single piece, and consequently much stronger and better than when made by welding of separate pieces.

My improved process consists in first upsetting the iron or blank at one end to form the knuckle, then rolling the bar in such manner as to give it an elliptical or other desired form, except at the end adjacent to and on which the knuckle is formed, said end being left in the rectangular form, or form of the blank from which the iron is made; then sawing to form the slits or rabbets for the interlapping ears of the joints; again upsetting the blank to form the inner concavity or concave shoulder of the joint; then filling the outer faces of the knuckles by means of files having concave faces conforming to the convexity of the face of the knuckle; and, lastly, the drilling of the parts of the joint for the reception of the connecting-rivet, all as hereinafter explained.

In the accompanying drawings, Figure 1 represents a blank or bar of suitable form for making a carriage-top iron. Fig. 2 shows the same after it has been upset and the knuckle formed thereon. Fig. 3 shows the bar after it has been subjected to the action of the rolls. Fig. 4 shows the bars after they have been subjected to the saw or saws forming the interlapping ears of the joint, one formed by the use of a single saw, forming a central slit, and the other by the use of two saws, leaving the central tongue. Fig. 5 shows the bar with the central slit after it has been acted upon in the upsetting-machine by a plunger or domino, also shown, and having a rounded end, which forms the inner concave shoulder indicated by dotted line. Fig. 6 shows the two parts of a carriage-top iron complete, and Fig. 7 shows the same parts united in proper form.

The bar indicated in Fig. 1 is of metal of the desired size, and preferably of rectangular form in cross-section, as being less expensive than bars rolled into the elliptical form usually given to these irons, though other forms may be operated upon, if desired. These bars, after being properly heated at one end, are subjected, first, to the action of suitable dies in a machine for upsetting the iron to form the knuckle *b*, and upon one side thereof the shoulder *c*, as indicated in Fig. 2. The iron is next passed between rollers having suitable grooves in their peripheries to give the desired form to the body of the iron, with a suitable longitudinal groove or socket adapted to receive and permit the knuckle and a portion of the bar adjacent thereto to pass between the rolls without being acted upon or changed in form thereby, as indicated in Fig. 3. For this part of the operation or process the iron should be brought to a white heat, or approximating thereto to such degree as best adapts it to be rolled into the required form, and, preferably, the iron is passed back and forth between the rolls in a manner described in said application. The iron is next subjected to the action of one or more saws, according to the part of the joint to be formed—that is to say, the knuckle end of the iron is first brought to the required heat to adapt the saw or saws to cut it easily, and it is then, through a suitable arrangement of feeding-table, guides or gages, and clamps, presented for forming the bifurcated end $d'$ $d^2$, with the central slit, to the action of a single rotary saw, and for forming the central tongue, $d$, to the action of the parallel saws or double saw. This last-named operation leaves the knuckle with projecting fins, to remove which and any surplus iron on the knuckle the iron is next subjected to the action of a filing-machine having one or more files provided with concave filing-surfaces corresponding to the convex outer face of the knuckle.

Being necessarily of greater diameter than the knuckle, the saws fail to give the proper concavity to the inner shoulder, (indicated by dotted lines at $e$, Fig. 5,) and to form this the irons are returned to the upsetting-machine and subjected therein to the action of a convex-faced plunger or domino, E. This operation is necessary only with the female portion of the joint, as the shoulders $e'$ $e^2$ in the other portion, being outside of the central tongue, and therefore accessible, can be formed by a circular cutter or planer operating in connection with the drill, or in other suitable manner. They can, however, be formed by means of a bifurcated plunger or domino in the upsetting-machine, the same as in the case of the inner or central shoulder, $e$. The irons are then subjected to the action of a drilling-machine for forming the central perforation for the rivet or fastening uniting the parts of the joint, after which the parts may be united, as indicated in Fig. 7, and finished up in any usual or suitable manner.

I have hereinabove indicated the preferred order of the several steps of my improved method of forming the irons; but it will be apparent that the order or arrangement of some of these may be varied, and that the blank or iron may be subjected at different stages to the action of the dies and of the files for removing inaccuracies or imperfections, and the fins formed in one operation at any stage of the process may be removed previous to subjecting the iron to another of the operations described; also, after rolling, which tends to curl the irons, they may be straightened in any usual or preferred manner, this forming no necessary part of the process.

Having now described my invention, I claim as new—

The herein-described improvement in the art of forming the joints in carriage-top or similar irons, which consists in first upsetting the iron to form the knuckle; secondly, rolling the iron for giving the body thereof the required form; thirdly, sawing the knuckle to form the interlapping ears of the joint; fourthly, again upsetting to form the inner concave shoulder; fifthly, filing the convex outer ends of the knuckle or ears of the joint, and, lastly, drilling the rivet-holes therein, substantially as described.

In testimony whereof I have hereunto set my hand this 7th day of November, A. D. 1887.

FRANK SCHREIDT.

Witnesses:
GEO. BOWERS, Jr.,
SAMUEL MARRIOTT.